Patented Apr. 4, 1939

2,152,942

UNITED STATES PATENT OFFICE 2,152,942

COAGULANT

William S. Wilson, Brookline, Mass., assignor, by mesne assignments, to Monsanto Chemical Company, a corporation of Delaware No Drawing. Application June 13, 1936, Serial No. 85,050

6 Claims. (Cl. 210—23)

The present invention relates to water purification and it has particular relation to methods of and materials for collecting and removing finely divided insoluble materials suspended therein.

The main objects of the invention are to provide:

A method of effectively removing suspended matter from waters of high alkalinity such as are obtained after softening of hard water with lime or soda ash or a combination of the two:

A material for removing suspended matter from water of the above indicated character which is effective in very small doses, which does not involve the addition of corrosive materials at least in substantial amounts and in which the increase in permanent hardness is negligible.

A coagulant for waters containing large amounts of calcium and magnesium compounds which forms an exceptionally durable and easily filterable floc, that is especially effective in removing suspended matter from water.

A coagulant which is economical to prepare and which does not cake in storage.

These and other objects will be apparent from consideration of the following specification and the appended claims.

Supplies of water used for drinking purposes, bathing, laundering, boiler feeding and other domestic and industrial applications especially after addition of lime or soda ash or a combination of lime and soda ash for softening purposes, frequently contain finely divided sedimentary materials such as calcium carbonate, mud and other finely divided suspended matter that must be removed prior to use of the water but which because of their fine state of division are difficult to separate by settling, filtration and other common methods of treatment.

For purposes of speeding up operations, it is common practice to add a small amount of an agent termed a "coagulant" which, upon addition to the water, forms a voluminous, flocculent precipitate that entraps and sweeps out finely divided matter. This precipitate may easily be removed by the usual methods of settling and filtering.

The most common coagulant heretofore employed has been aluminum sulfate which was fairly cheap and was usually effective in waters which were low in calcium and magnesium compounds and therefore did not require softening. However, in regions such as the Middle West of the United States, many cities are supplied with water which carries much of such compounds in the form of carbonates and bicarbonates, (alkalinity) and also in other forms of permanent hardness such as sulfates. These compounds were frequently eliminated in part by addition of lime ($Ca(OH)_2$), soda ash or lime and soda ash which precipitated a part of the soluble compounds in the form of finely divided insoluble carbonates. It was as already indicated, desirable to remove the precipitate along with other insoluble materials such as mud by means of a floc forming coagulent. Aluminum sulfate naturally was suggested for the purpose, but was not entirely satisfactory because excessive amounts were required, thus unduly increasing the cost of clarification and introducing large amounts of aluminum and sulfate ion into the water. It is believed that this demand for large amounts of the aluminum salt was due to the fact that softening can be only partial. Hardness, even after softening expressed as $CaCO_3$ will usually amount to at least 60 or 80 parts per million, and commonly it will amount more nearly to 100 parts. Most usually the so called "alkaline" forms of calcium and magnesium (carbonate, bicarbonate and hydrate) will be present in proportions of at least 40 or 50 parts per million. Addition of excesses of lime (as is usually done) in order to bring the carbonate alkalinity to minimum value results in the addition of calcium in the form of hydrate. In the presence of these forms of alkalinity, aluminum sulfate becomes inefficient as an agent of clarification.

The present invention is based upon the discovery that ferric sulfates particularly normal ferric sulfates of the formula $Fe_2O_3(SO_3)_3 \cdot xH_2O$, are effective coagulants for the above described artificially softened waters and small amounts will clarify water that would require very large amounts of aluminum sulfate.

Various methods may be employed in the preparation of these normal and highly soluble ferric sulfates. One convenient method involves reacting sulfuric acid of 35 to 40° Bé. with pyrite cinder until about 27% or preferably more of the cinder has passed into solution and then concentrating the acid while reacting it with the remainder of the cinder until a thick solution is formed. Subsequently the solution is converted into a dry but hydrated form by passing from liquid to solid state as quickly as possible. This may be done by drum drying under vacuum, spray drying or by mixing the solution with enough ground and partially or completely dehydrated ferric sulfate to take up any water of solution. This dry product may then be calcined to drive off water of hydration at a temperature of about 400 to 450 C. The product is in the form of porous shot-like pellets which are non-caking and readily water soluble. An excellent product is also obtained by reacting iron oxide with 93% or higher concentration sulfuric acid at a temperature above 140° C. This material is calcined to drive off water of hydration and at temperatures around 50° C. it will dissolve in one and one-half to twenty times its weight of water in a period of 5 or 10 minutes or even less. Various other methods of forming neutral ferric sulfates suitable for the present purpose have been developed but the above described is typical.

Numerous other ferric sulfates, for example those of the formulae:

$$Fe_2O_3 4SO_3 9H_2O, Fe_2O_3 2SO_3 H_2O, 2Fe_2O_3 5SO_3 17H_2O$$

are known to the art. However, only compositions consisting mainly of normal sulfates are contemplated by the present invention. The others are either completely inoperative or are at least unsatisfactory because they are too acid or else they cannot economically be dissolved and precipitated from water solutions.

Ferrous sulfate is also precluded because excessive amounts are required and it does not completely precipitate within a reasonable period of time. It introduces an unnecessary amount of sulfate ion into the water, and the residual iron in the water is considerable and it may precipitate in storage tanks or reservoirs, conduits, boilers and the like and thus cause trouble. Furthermore, it cakes very badly and sometimes it is necessary to blast it loose after storage.

The Missouri-Mississippi River water as employed at St. Louis, Missouri is a typical example of a water which is especially amenable to treatment by means of normal ferric sulfate. The analysis of this water (A) prior to and (B) subsequent to the lime softening, like that of most water supplies, varies somewhat from time to time but the following is typical:

| | Total solids (dissolved) | $SiO_2$ | Fe | Ca | Mg | Na+K | $H_2CO_3$ | $SO_4$ | Cl | $NO_3$ | Total hardness as $CaCO_3$ |
|---|---|---|---|---|---|---|---|---|---|---|---|
| A | 310 | 14 | 1.7 | 47 | 10 | 40 | 153 | 91 | 18 | 4.6 | 158 |
| B | 228 | 8 | 2.5 | 21 | 7.5 | 3.6 | 48 | 94 | 18 | 4.9 | 83 |

These values are in parts per million.

Comparative plant scale tests of the value of ferric sulfate and aluminum sulfate as coagulants were conducted upon water of approximately this analysis using lime as a softening agent. In these tests turbidity was determined by the methods given in American Public Health Association's Standard Methods for Water Analysis (1933).

The solutions of alum were made up in conventional manner. Lime was employed as milk of lime. These two ingredients were fed continuously to the water in a one million gallon tank, from which the water flowed to a second one million gallon tank and finally to a five million gallon tank from which it was discharged. Filtration was effected by means of conventional filters.

Concentrated ferric sulfate solutions may be made up by dissolving as high a ratio of anhydrous ferric sulfate as practicable in water at normal atmospheric temperatures. Good results are obtained by adding 100 pounds of ferric sulfate to 150 pounds of water. This is let stand for 10 minutes and then 135 pounds of ferric sulfate and enough water to give a fluid solution are added. Solution should be complete in 30 minutes. Usually the ratio of water to ferric sulfate should fall within the range of 1.5 to 5 parts by weight per unit weight of ferric sulfate. With cold (e. g. 50° F.) water best results are obtained when ferric sulfate is in a ratio of about one part by weight for two parts of water.

The following constitute average results obtained from runs extending over several days:

| | | $Al_2(SO_4)_3$ | $Al_2(SO_4)_3$ | $Fe_2(SO_4)_3$ |
|---|---|---|---|---|
| Rate of treatment—M* gal. per day | | 2.760 | 2.502 | 2.600 |
| Lime added—lbs. per M. gal | | 983.0 | 900.0 | 900.0 |
| Coagulant—lbs. per M. gal | | 50.0 | 250.0 | 50.0 |
| Turbidity (in parts per million) | Raw water | 695.0 | 555.0 | 717.0 |
| | Filter influent | 23.30 | 4.30 | 2.80 |
| | Filter effluent | 6.40 | 0.88 | 0.37 |
| Alkalinity as $HCO_3$ (in parts per million) | Raw water | 146.40 | 141.50 | 137.0 |
| | Filter influent | 50.0 | 52.5 | 55.0 |

*M=1 million.

In general about 0.2 to 0.5 grain of anhydrous normal ferric sulfate are effective in waters of this type, though more may be used if desired. The temperatures employed were those of the river water and ran about 48 to 60° F. with an average of about 50 or 52° F.

It will be apparent from the table that even with slightly higher pumping rates and with higher initial turbidities, 50 pounds of normal ferric sulfate per million gallons gave a filter effluent of lower turbidity than 250 pounds of aluminum sulfate. In other words, the ferric sulfate was more than 5 times as effective as aluminum sulfate in an initially fairly hard, alkaline water. Water treated with 50 pounds per million gallons of aluminum sulfate was not adequately clarified.

Tests of the relative effectiveness of ferrous sulfate and normal ferric sulfate were made by determining the relative amounts of the two ingredients required to obtain flocculation in a water such as above described which had been softened by the addition of enough lime to give a total $CaCO_3$ hardness of about 83 or 84 parts per million. This water has then settled until the turbidity reached 270 parts per million. Ferrous or normal ferric sulfates, as the case might be, was added until flocculation occurred. With ferric sulfate this occurred after the addition of 1.9 grains per gallon, while in the case of ferrous sulfate 4.0 grains were required. This indicated that ferric sulfate is more than twice as effective as ferrous sulfate in the particular water.

In naturally soft nearly neutral or slightly acid waters, aluminum sulfate is practically as effective and in some cases even more effective than ferric sulfate as a coagulant. Boston city water is of this type and has the following analysis in parts per million:

| Total solids (dissolved) | SiO$_2$ | Ca | Mg | K+Na | HCO$_3$ | Cl | SO$_4$ | Total hardness as CaCO$_3$ |
|---|---|---|---|---|---|---|---|---|
| 43 | 2.1 | 4.4 | 1.0 | 3.9 | 16 | 3.2 | 9.8 | 15 |

A nearly neutral (6.5 pH) sample of this water required 1.55 grains per gallon of normal anhydrous ferric sulfate to produce coagulation. Only 1.1 grains of aluminum sulfate was required.

Ferric sulfate is also excellent for coagulation of water low in carbonate hardness or alkalinity but high in calcium and/or magnesium sulfates. Example: Ferric sulfate (normal anhydrous) was added to soft nearly neutral (7.5 pH) Boston city water of the foregoing analysis. Coagulation did not occur until about 1.9 grains per gallon of ferric sulfate had been incorporated. One hundred (100) parts per million of calcium sulfate were then added to a second sample of the same water. Only 1.05 grains per gallon of ferric sulfate was required to obtain coagulation. Three (3) grains per gallon of aluminum sulfate was required under like conditions.

The relative merit of aluminum sulfate and ferric sulfate were further tested upon a water having approximately the following analysis:

| | Total solids | SiO$_2$ | SO$_4$ | Ca | Na+K | Mg | HCO$_3$ | Cl | NO$_3$ | CaCO$_3$ |
|---|---|---|---|---|---|---|---|---|---|---|
| Raw | 318 | 10 | 60 | 57 | 15 | 27 | 240 | 9 | 11 | 253 |
| Treated | 176 | 9.2 | 66 | 17 | 14 | 16 | 50 | 10 | 4.4 | 108 |

In the treated water, 11 grains per gallon of lime for softening and 1 grain per gallon of aluminum sulfate for clarification had previously been used. 0.4 grain per gallon of normal anhydrous ferric sulfate was found to be equivalent to the aluminum sulfate.

The suitability of normal anhydrous ferric sulfate for coagulating more or less muddy Mississippi River water which had been treated with caustic soda but without lime softening was determined and is recorded as follows:

| Dosage Fe$_2$O$_3$3SO$_3$ grains per gallon | | | | |
|---|---|---|---|---|
| NaOH | 1.0 | 1.5 | 2.0 | 3.0 |
| P.p.m. | Turbidity of product p.p.m. | | | |
| 28.6 | 2.0 | 1.0 | 0.4 | 0.4 |
| 81.2 | 2.0 | 0.8 | 0.6 | 0.6 |

In the table ferric sulfate dosage is expressed as grains per gallon while caustic dosage and turbidity are expressed as parts per million (p. p. m.).

For purposes of showing the relative merit of normal anhydrous ferric sulfate and aluminum sulfate as secondary coagulants for treatment of water which had been preliminarily softened with lime and then clarified with ordinary copperas and alum, the following test was conducted upon raw water of the approximate analysis in parts per million:

| Total solids | SiO$_2$ | Ca | Mg | Na+K | HCO$_3$ | SO$_4$ | Cl | NO$_3$ | Total hardness as CaCO$_3$ |
|---|---|---|---|---|---|---|---|---|---|
| 307 | 12 | 48 | 12 | 39 | 158 | 88 | 18 | 3.9 | 169 |

The water was partially softened by treatment with 5 grains per gallon of lime. It was then coagulated with 0.7 grain per gallon of ferrous sulfate (copperas) and settled in an ordinary Dorr system. About 0.4 grain per gallon of alum was added to the water and it was again let settle for 13 hours. The hardness of the water at this time was approximately 100 parts per million, the alkalinity was 22 parts per million phenolphthalein alkalinity, and 43 parts total alkalinity. Final coagulation was obtained by addition of 0.22 grain per gallon of normal anhydrous ferric sulfate. Aluminum sulfate did not produce coagulation until 0.57 grain per gallon had been added.

Although ordinary aluminum sulfate is substantially as effective and in some cases even more effective than normal ferric sulfate in neutral or nearly neutral soft waters, it is found that in soft waters of considerable acidity, ferric sulfate is again far superior as an agent of clarification. In these waters, ferric sulfate is especially effective in the removal of organic coloring. These acid waters are frequently encountered in the winter months when much carbon dioxide is retained by the water.

The efficiency of normal anhydrous ferric sulfate was demonstrated in Boston city water while the latter was in a relatively acid condition and the results of the tests are tabulated as follows:

| pH | Grains per gallon Fe$_2$(SO$_4$)$_3$ | Grains per gallon Al$_2$(SO$_4$)$_3$ |
|---|---|---|
| 6.0 | 1.4 | 0.6 |
| 5.5 | 1.1 | 0.5 |
| 5.0 | 0.6 | 0.6 |
| 4.5 | 0.35 | 1.6 |

The pH values given represent the acidity of the water at the time of flocculation.

The amount of normal anhydrous ferric sulfate may vary over considerable range and preferably should not be much less than about 0.3 grain per gallon. Usually not more than 3 or 4 grains per gallon will be required.

It will be apparent that ferric sulfate may be added to relatively hard or alkaline water at substantially any stage in the process of treatment. For example, it may be added before addition of the softening agent or subsequent thereto. In case coagulation is subsequent to addition of lime or soda ash or a combination of the two, a suitable intermediate period (e. g. a day or more) for partial settling of precipitates may be allowed but is not strictly necessary. Some ferric sulfate may be added to hasten this preliminary clarification.

As is well understood by those skilled in the art—soda ash or caustic soda to remove all or a part of the permanent hardness may also be added in appropriate amounts.

Normal ferric sulfate may be used for clarification of hard boiler feed waters. In this application it may be employed to coagulate the water after conventional lime and/or soda ash treatment externally of the boiler. It may also be added internally to boiler water containing softening agents. When so applied it forms a soft floc which is easily removed by "blowing-down". Its use results in a sulfate ion concentration favorable to inhibition of caustic embrittlement and the deposition of hard scale in the boiler is retarded.

Iron added as normal ferric sulfate to hard waters is substantially completely precipitated and removed. This is in sharp distinction to either aluminum sulfate or ferrous sulfate which often leaves large and objectionable proportions of aluminum or iron in solution.

This soluble alumina or ferrous sulfate may precipitate upon standing, giving turbidity and discoloration in the finished water. The precipitates also tend to clog water lines and produce scale in steam boilers. The large amounts of aluminum sulfate or ferrous sulfate required where these compounds are used as coagulants also results in introduction of a considerable degree of additional permanent hardness. Where normal ferric sulfate is employed, but small amounts of additional hardness are introduced and this is in the form of sulfate ion which is found to be useful in softened boiler waters for purposes of reducing embrittlement of metal due to the concentration of caustic which normally attends the operation of boilers with softened feed waters.

What I claim is:

1. A method of treating hard water containing in excess of 100 p. p. m. of alkalinity expressed as calcium carbonate, which comprises adding to the water lime in order partially to soften it, together with a primary coagulant from the group consisting of ferrous sulfate and aluminum sulfate, subjecting the water to settling in order partially to clarify it subsequently adding normal ferric sulfate in an amount equivalent to 0.2 to 0.5 grain per gallon of normal anhydrous ferric sulfate to form a floc and then removing the floc together with the suspended material contained therein.

2. The method of purifying water for industrial and household uses and which contains in excess of 100 parts per million of alkalinity expressed as calcium carbonate which comprises subjecting the water to partial softening and primary coagulation by addition thereto of lime and a primary coagulant from the group consisting of ferrous sulfate and aluminum sulfate, subsequently effecting secondary coagulation by the addition, in floc forming quantity not substantially in excess of 0.5 grain per gallon, of normal ferric sulfate, thereby forming the ferric floc, then removing the floc together with the occluded suspended material contained therein.

3. The method as defined in claim 2, further characterized in that the amount of lime added is not substantially in excess of 5 grains per gallon.

4. The method as defined in claim 2, and further characterized in that the primary coagulant is copperas and alum.

5. The method of purifying water for industrial and household uses and which contains in excess of 100 parts per million of alkalinity expressed as calcium carbonate which comprises subjecting the water to partial softening by adding a limited excess of lime, adding ferrous sulfate as a coagulant and permitting the precipitate to settle, adding alum as a coagulant and permitting the further settling of precipitate, and finally coagulating the precipitate by the addition of normal ferric sulfate in floc forming quantity.

6. The method as in 5, wherein the amount of lime added is not substantially in excess of 5 grains per gallon, the ferrous sulfate is supplied in the proportion of approximately 0.7 grain per gallon, approximately 0.4 grain per gallon of alum is added, and the quantity of normal ferric sulfate corresponds with approximately 0.22 grain per gallon or normal anhydrous ferric sulfate.

WILLIAM S. WILSON.